Patented Aug. 7, 1923.

1,463,954

UNITED STATES PATENT OFFICE.

CHARLES W. HESS, OF EVANSTON, ILLINOIS.

FOOD PRODUCT AND PROCESS OF PREPARING THE SAME.

No Drawing.   Application filed February 23, 1922. Serial No. 538,770.

*To all whom it may concern:*

Be it known that I, CHARLES W. HESS, a citizen of the United States, residing at Evanston, in the county of Cook and State of Illinois, have invented certain new and useful Improvements in Food Products and Processes of Preparing the Same, of which the following is a specification.

The object of this invention generally is to make possible the commercial use of cooked whole grains of cereal either as an article of food or as an ingredient of such foods as chocolate, candy, confections and the like.

To accomplish this the grains must be made easy to masticate and digest and must be preserved in a fresh, wholesome condition until they reach the consumer. It is therefore an important object of the invention to cook the grains under conditions that will render them crisp and friable and provide them with a thin, fragile shell or crust that will protect the crisp interior from the action of moisture in the air or in such foods as they may be mixed.

These and other objects are attained by a process of which the following procedure is a selected embodiment illustrating the best method known to me at present for treating average cereals.

For a batch of one hundred pounds of cereal I first thoroughly mix one and one-half pounds of baking soda with one pound of yeast and add sixteen quarts of boiling water. When the water has thoroughly taken up the soda and yeast, I pour in one hundred pounds of recleaned cereal and thoroughly mix it with the liquor.

The cereal is allowed to remain in the liquor for about thirty minutes and is stirred frequently to insure uniform and proper absorption. Under average conditions this length of time will be sufficient for the cereal to take up practically all of the liquor, but suitable variations may be made to suit particular cereals and sizes of grain.

The second step of the process is to thoroughly cook the cereal and for this purpose I have found it satisfactory to place it in shallow trays supported by racks within a suitable retort connected with a source of steam of sufficient capacity to produce and maintain a temperature of approximately 240° F. under seventeen and one-half pounds pressure. Under average conditions this temperature and pressure should continue for about one hour and a quarter to insure thorough cooking, but different cereals and different grades of cereals require some variations.

In the third step the cooked cereal is placed in a drier and the excess moisture driven off. The form of drier is immaterial and may be varied to suit individual preferences or particular conditions, it being sufficient for the purpose of this process if the cooked cereal is reduced to substantially normal moisture content. Preferably the trays of steamed cereal are transferred to racks and maintained at a relatively low temperature for several hours so that the drying will take place evenly and the grains will be in uniform condition throughout.

In the final step of the process the cereal is placed in a suitable oven and baked until crisp. The time required to produce this condition will vary somewhat with the nature of the cereal and the particular oven. I prefer to use an oven having some form of stirring means that will keep the cereal continuously in motion and subject all the grains to practically the same heat conditions.

In the first step of the process the grains change color and become lustrous as the liquor is absorbed. During the second step the grains swell and soften under the action of the steam and take on the general appearance of steamed or boiled cereals. Under the drying, however, they shrink, assume a horny appearance and regain some of their original toughness. In the final step the grains again enlarge, brown like bread and become crisp and friable. The outer portion of the grains takes the form of a thin shell or crust that is substantially moisture proof under ordinary conditions, but is brittle and is easily crushed between the teeth.

The yeast and soda are employed to leaven the grain preparatory to the baking thereof, and also to produce a thin moisture-proof shell or crust on the exterior of the grain under the baking action. It is an important object of the present invention to bake the grain as distinguished from roasting the same in order to prevent the grain from becoming all crust throughout the body of each kernel, and to produce a product which will have a moisture-proof crust or shell enveloping a baked interior.

The proportions of the ingredients forming the liquor stated above give the best results, but good results can be obtained by changing these proportions quite widely. Fairly satisfactorily results can be obtained by using either yeast or soda alone, but the grains are not so well moisture-proofed as when both yeast and soda are used. Those skilled in the art may readily change the proportions to suit particular conditions and may substitute known equivalents. The steaming step may be varied to suit conditions so long as the cereal is thoroughly cooked. It is not absolutely necessary that all excess moisture be driven off before the baking step, but my experience is that the best results are had when only substantially normal moisture is present in the grains when the cereal is put in the oven.

Heretofore attempts to use the whole grains of cereals commercially have been unsatisfactory because of the absorption of moisture which rendered the grains tough and unpalatable; and when mixed in chocolate, candy or confections, the loss of moisture to the cereal caused the mixture to disintegrate. I have found that cereals treated by this process will resist the action of moisture for a very long period even when embedded in chocolate, candy and confections of the usual consistency.

I claim:

1. The process which consists in subjecting a cereal to a liquor containing a leavening agent for a suitable period, steaming the cereal until cooked, drying the steamed cereal, and baking it until crisp.

2. The process which consists in subjecting a cereal to a liquor composed of soda, yeast and water for a suitable period, steaming the cereal until cooked, drying the steamed cereal, and baking it until crisp.

3. The process which consists in subjecting a cereal to a liquor composed of yeast, soda and water in the proportions of one and one-half pounds of soda to one pound of yeast and sixteen quarts of boiling water, steaming the cereal until it is cooked, driving off the excess moisture, and baking the cereal until crisp.

4. The process of treating cereals which consists in immersing the grains in a liquor adapted to produce a moisture proof surface when baked, steaming the cereal until cooked, driving off the excess moisture, and baking until crisp.

5. The process which consists in steaming a cereal in the presence of a leavening agent, drying the steamed cereal, and baking it until crisp.

6. The process which consists in steaming a cereal in the presence of soda and yeast, drying the steamed cereal, and baking it until crisp.

7. A food product consisting of leavened and baked grains of cereal covered with a brittle moisture proof shell.

CHARLES W. HESS.